Jan. 27. 1925.

M. T. DENNE 1,524,343

INSEAM TRIMMING MACHINE

Filed Oct. 30, 1920   4 Sheets-Sheet 1

INVENTOR
Mark Thomas Denne
by Heard Smith & Tennant.
Attys.

Jan. 27. 1925. 1,524,343

M. T. DENNE

INSEAM TRIMMING MACHINE

Filed Oct. 30, 1920 4 Sheets-Sheet 2

INVENTOR
Mark Thomas Denne
by Heard Smith & Tennant.
Attys.

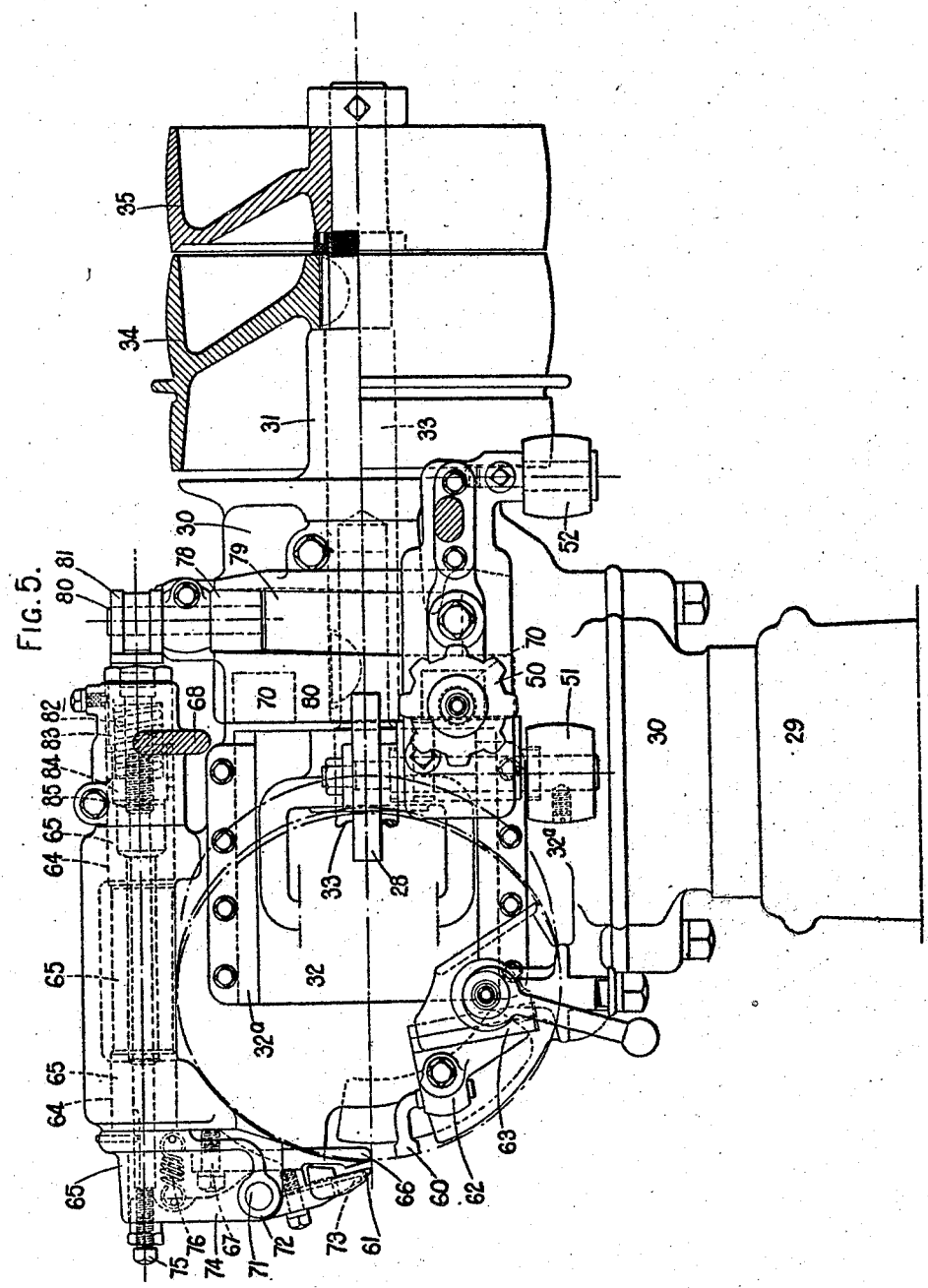

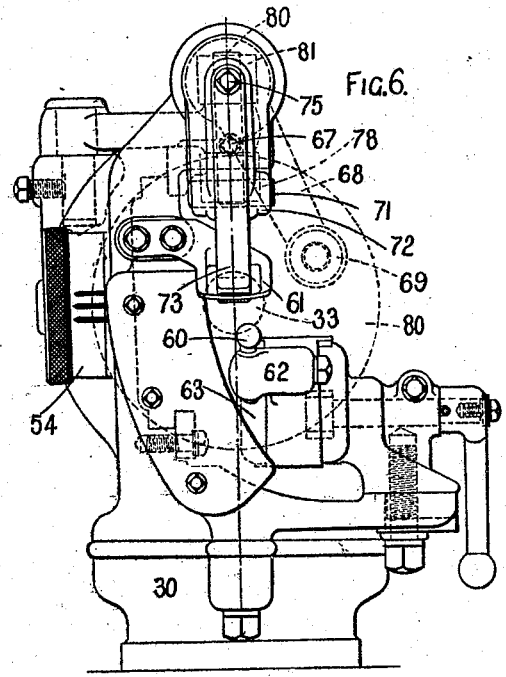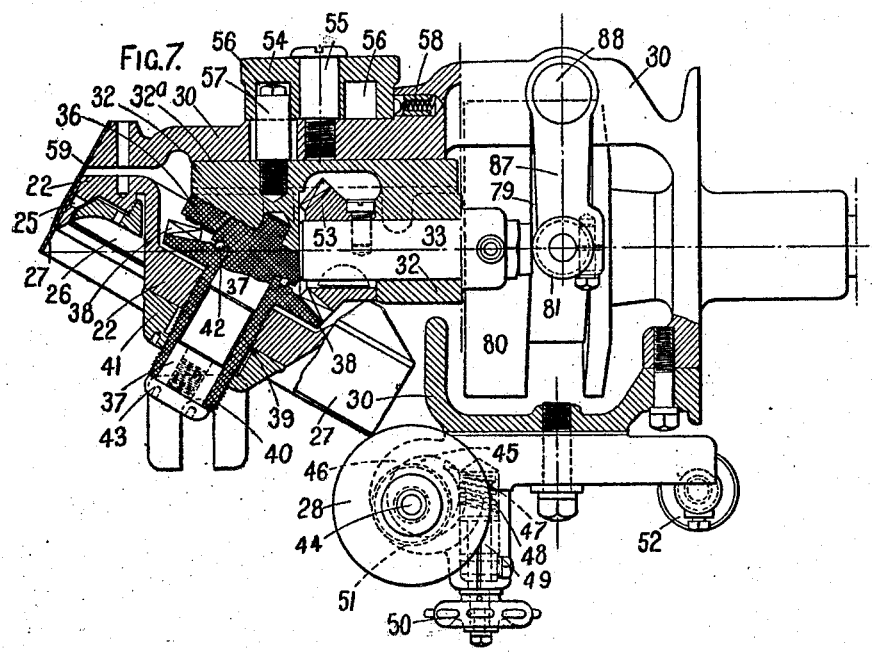

Patented Jan. 27, 1925.

1,524,343

UNITED STATES PATENT OFFICE.

MARK THOMAS DENNE, OF WARLINGHAM, ENGLAND.

INSEAM-TRIMMING MACHINE.

Application filed October 30, 1920. Serial No. 420,782.

*To all whom it may concern:*

Be it known that I, MARK THOMAS DENNE, a subject of the King of Great Britain, residing at Edgehill, Warlingham, in the county of Surrey, England, have invented new and useful Improvements in Inseam-Trimming Machines, of which the following is a specification.

This invention has reference to improvements in and relating to machines for use in the manufacture of boots and shoes and in particular to what are known as inseam trimming machines.

A serious defect inherent in inseam trimming machines provided with a rotating trimming knife having a continuous cutting edge is that, owing to the necessary fairly high speed of rotation of the knife, undue heat is produced (notwithstanding that automatic grinders are provided to maintain a sharp edge) and with a view to preventing this, such knives have been made with a plurality of gaps so as to break up the continuous edge into a number of short edges. This expedient has not, however, so far as my experience goes, been very successful in attaining the desired object, at any rate when the heavier classes of work are dealt with. Not only that: Owing to the gaps producing a plurality of short cutters or knives each having its side edges at an obtuse angle with respect to the plane in which the cutting edges move, whilst only the very extreme front edge is sharp, and owing, further, to the fact that the whole of the cutting edge of each separate cutter and of all the cutters are in one and the same plane of rotation, the advancing side edges, which obviously are blunt, chop or cleave the work so that very considerable vibration is set up; the force required to rotate the cutter is proportionately very great; wear and tear is increased and the work must be very firmly supported and gripped; all of which are merely mitigated if the work be fed forward very slowly.

The main object of my invention is to obviate the aforementioned defects and to this end it consists in an inseam trimming machine having a knife the cutting edge of which is sinuous so that a slicing cut is effected, the knife being so made that it can be maintained sharp by means of grinding devices such as have heretofore been provided in machines of the character in question.

My invention also comprehends improved means for enabling the cutter to be set during the operation of the machine so as to trim the inseam at any desired distance from the seam stitches and also improved means for setting the grinding device as will be explained.

It may be desirable to mount the rotating knife with its axis at an angle with respect to the direction of movement of the work, and for feeding the work I may employ a four motion feed mechanism, features which have been known for many years, and I do not broadly claim either of them.

In the accompanying drawing I have illustrated merely by way of example an inseam trimming machine having a cylindrical form of knife but I wish it to be understood that my invention is not limited thereto as it can with equal facility be applied to machines having a crown knife or a disc knife.

In order that the method whereby the knife having a sinuous cutting edge is produced and which may be maintained sharp by the ordinary grinding means, I have annexed illustrations comprising Figs. 1 to 4, the inseam trimming machines being illustrated in Figs. 5 to 7.

Fig. 5 is a side elevation and Fig. 6 a front elevation of the improved inseam trimming machine, a cylindrical knife being indicated by broken lines, and Fig. 7 is a plan view partly in section.

Figure 1:
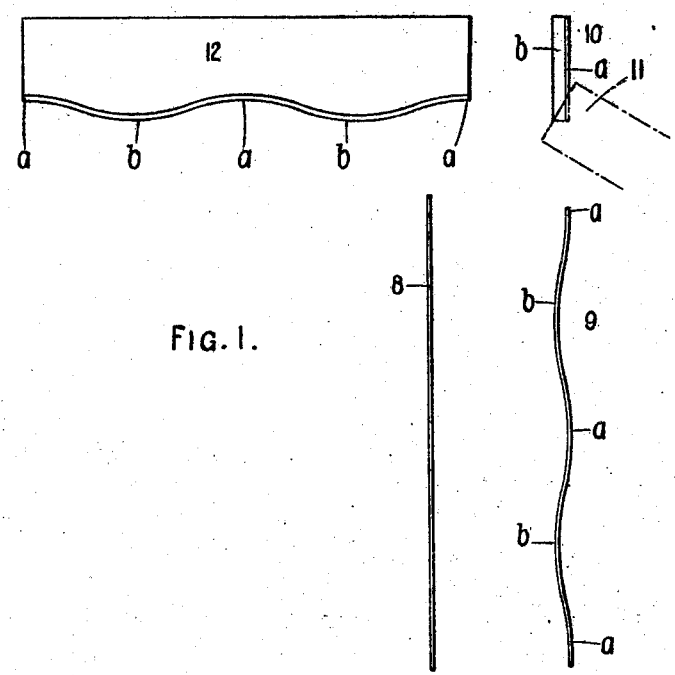
Fig. 1 shows a plain knife or what may be taken to be a development of a cylindrical cutter.

Referring firstly to Fig. 1 with a view to ascertaining the method whereby my improved knife is produced 8 shows an edge view of a steel blade which is to be formed with a sinuous cutting edge. For this purpose I corrugated the blade as shown at 9. At 10 an end view of the corrugated blade is shown. If the said corrugated blade be next ground away by means of a grinding wheel (indicated at 11) which is at the desired angle according to the particular desired acuteness of the cutting edge, it will be seen that when the grinding begins, the parts $a$ only of the corrugated blade will be touched by the grinding disc, and as the grinding proceeds the said parts will be more and more ground away and simultaneously therewith a gradually increasing part of the blade on each side of the part $a$ be ground away until, when a sharp edge has been produced on the parts $b$, the whole edge of the blade will have been sharpened and the cutting edge will be in the form of a sinuous curve as shown at 12, which shows the sharpened corrugated blade laid down.

It will be obvious that the blade during grinding and during use also must be maintained in the form to which it has been shaped and if the blade itself is not stiff enough to retain its shape it will be necessary to provide a suitable holder or clamp.

Having described the method whereby in accordance with my invention a sinuous cutting edge is produced I now propose to describe a constructional form of clamp or cramp whereby a sinuous cutting edge may be produced on a disc cutter.

Figure 2:
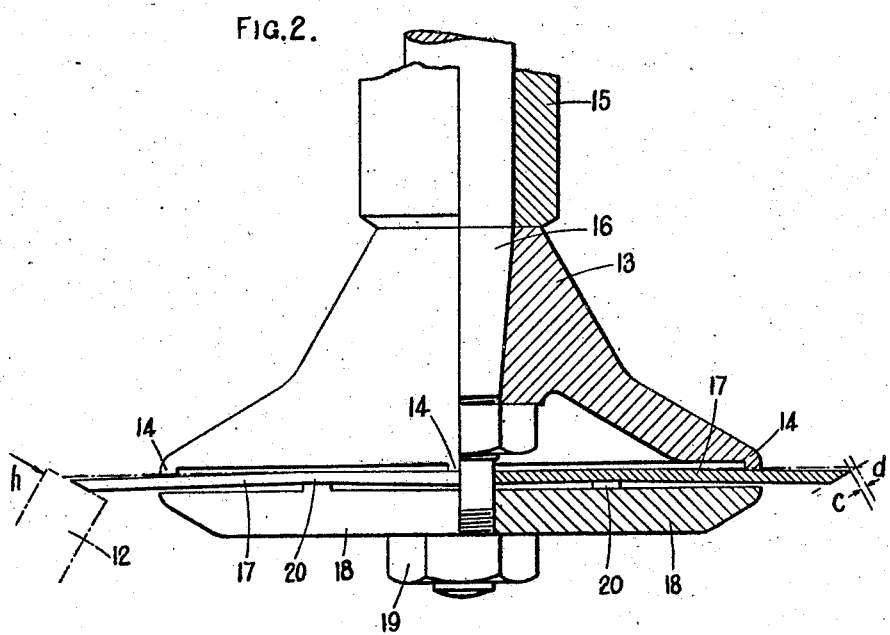
Fig. 2 shows in side elevation, partly in section, a disc knife made in accordance with my invention.

This is illustrated in Fig. 2 and comprises a body 13 in the form approximately of a truncated cone which is fixed on a shaft 16 that is supported in a bearing 15. The rim or edge of the face of the body 13 has upstanding from it snags or snugs 14 on which the steel disc 17 that is to form the knife is to rest. The disc 17 has a central aperture through which the end of the shaft 16 projects, the two having a fairly comfortable fit so that the disc will be maintained in its position laterally of the body 13. Applied against the outer face if the disc 17 is a plate 18 through a central aperture in which the shaft 16 also projects, there being again a comfortable fit between them, and the projecting end of the shaft 16 is formed with a screw-thread to receive a nut 19. The inner face of the plate 18 has snags or snugs 20 which are located midway between those (14) on the body 13.

If now the nut 19 be screwed up the snags 14 and 20 will bend the disc 17 so as to produce undulations therein by pressing the plate or disc into the spaces between the respective snags 14 and 20, more or less as shown.

If now the shaft be rotated and a grinding wheel indicated at 21 brought up to the edge of the disc a sinuous cutting edge will after a time be produced having undulations which are dependent upon the extent to which the disc has been deformed, as described, and which, in the example illustrated, have a depth indicated by the lines $c$, $d$.

Figure 3:
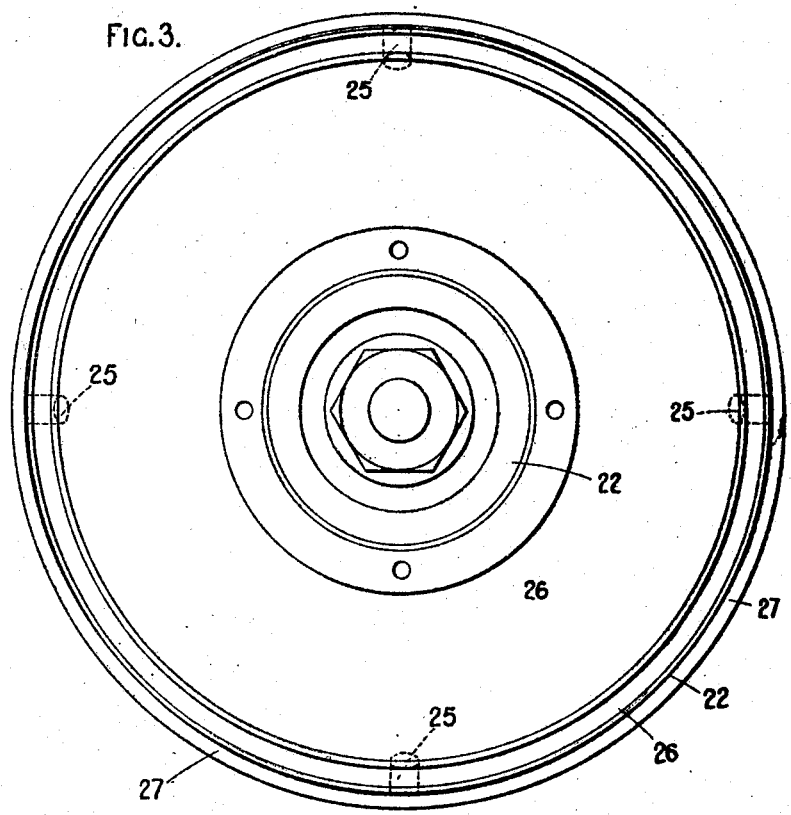
Fig. 3 is a front view and Fig. 4 a side elevation partly in section of a cylindrical knife made in accordance with my invention.
Figure 4:
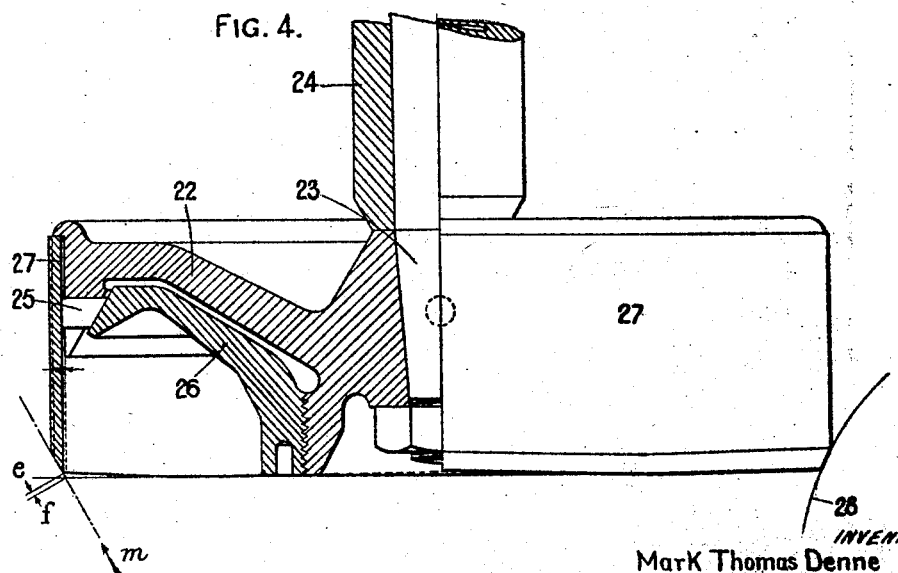

In Figs. 3 and 4, means are shown respectively in front view and side elevation, partly in section, whereby a sinuous cutting edge may be formed in accordance with my invention on a cylindrical knife.

In this case 22 is the body of a holder or support that is fixed on a shaft 23 carried in a bearing 24. The body 22 has at its periphery a forwardly extending tapering flange in which there are a number of apertures to receive slideable pins 25. Screwed to the boss of the body 22 is a dished plate 26 the periphery of which is conical and fits against the angular faces of the pins 25 so that by screwing up the plate 26 the pins 25 will be forced radially outwards.

Placed around the flange of the body 22 is a hoop knife blade 27, which makes an easy fit on its support, and by tightly screwing up the dished plate 26, the pins 25 will force the parts of the blade against which they press away from the body 22, whereas the parts of the hoop blade intermediate of the pins 25 will, by reason of the tension thus put on the blade, rest firmly on the periphery of the body 22, so that the said blade will form undulations around the body, about as shown in Fig. 3.

If now the front edge of the hoop be ground away by a grinding wheel, indicated at 28, the cutting edge formed will be sinuous or undulating in the direction of rotation of the knife, and in the example illustrated the depth of the undulations is indicated by the dotted lines $e$ $f$.

It will be obvious that a similar result will be obtained if, instead of grinding the bevel of the cutting edge on the outer periphery of the blade as shown in the example illustrated, said bevel be ground on the inner face or periphery. Further, instead of the cutter body or blank being cylindrical as shown it may be made conical.

Referring now to Figs. 5 to 7, a standard 29 carries the head 30 of the machine, the head having bearings 31, 32 to support a shaft 33 on which fast and loose pulleys 34 and 35 are mounted, the former being driven from any suitable source of power.

The bearing 32 (see Fig. 7) has an angular face against which a plate 36 having a spindle 37 is secured. Mounted to rotate on said spindle is a bevel gear 38, the boss of which is in the form of an elongated sleeve, one part 39 of which is screw threaded to have screwed on it the body 22 that carries the hoop knife 27, and the other part 40 of which is of reduced diameter to receive a lock-nut 41. A ball bearing 42 is provided between the plate 36 and the boss of the bevel gear 38, and a disc 43, that abuts against the sleeve 40 and has a stem which screws into the spindle 37, serves as a means for maintaining the bevel gear against its bearing. Rotary motion is imparted to the bevel gear 38 and thus to the hoop knife 27 from the shaft 33 by means of the bevel pinion 53 fixed to said shaft.

The hoop knife 27 is formed with a sinuous cutting edge in the manner already described with reference to Figs. 3 and 4, and the said edge is maintained sharp, or is sharpened from time to time, by the grinding disc 28.

The spindle 44 (see in particular Fig. 7) on which the grinding disc 28 is mounted, is carried in a bearing located eccentrically in a disc 45 which disc is rotatably carried in a bearing 46, that is attached to the head 30, and is formed with worm teeth 47 with which a worm 48 gears, the spindle 49 of the latter having a hand-wheel 50 so that the operator may set the grinding disc up to the hoop knife whenever this may be desirable.

Rotary motion is imparted to the grinding wheel 28 by a belt (not shown) that passes over the pulleys 51, 52, the latter being driven in any desirable manner.

If desired any of the known automatically operated grinding means whereby the grinding or abrading disc is automatically periodically presented to the hoop knife may be provided in place of the hand operated means described.

The work is fed in a plane at right angles with respect to the axis of the shaft 33, and in order that the knife may be adjusted so as to cut nearer to or further from the inseam stitches the bearing 32 is itself carried slidably in slides 32ª in the head of the machine so that by moving the said bearing to the right, in Fig. 3, (it is shown in the extreme left hand position i. e. the position in which the inseam will be trimmed close up to the inseam stitches), the depth of the trimmed inseam may be increased to any desired extent up to the maximum.

For this purpose I mount a disc 54 at a convenient position on the head of the machine and which is adapted to be rotated around a spindle 55. The said disc is formed with an eccentric groove 56 in which a stud 57, that passes through an opening in the head and is fixed to the bearing 32, engages, so that by rotating the disc 54 the aforesaid adjustment of the knife is effected, this being, of course, possible whilst the knife is in operation. To prevent accidental rotation of the disc 54, a spring detent 58 may be provided, and in front of the hoop knife 27 the usual guard plate 59 will be provided.

The shoe is held up in the usual manner that is to say with its sole against a rest 60 and its crease engaged against a crease guide 61. The sole rest has its stem clamped in a support 62 which, in turn, is carried in a slide 63 so that it may be set up or down as desired, any suitable known means being provided to fix the parts in their adjusted position.

For feeding the shoe automatically I prefer to employ a four motion welt gripping device which preferably is constructed as follows: On the head of the machine and supported in bearings 64 is a bar 65 the front end of which has a jaw 66 secured to it by the screw bolt 67 and near its rear end said bar has an arm 68 that carries at its free end a cam roll 69 in engagement in the cam groove 70 of a disc mounted on the shaft 33, whereby oscillating movements are imparted to the bar 65 and the jaw 66. Mounted on a pivot 71 in a bearing 72 depending from the front end of the bar 65, is a jaw 73 between which and the jaw 66 the welt is to be gripped in the usual way and thereafter the bar 65 and with it the said jaws, oscillated to feed the work. The jaw 73 has an upward extension 74 which carries a set-screw 75 and which part is acted on by a spring 76 that tends to open the jaws.

Passing longitudinally through the bar 65, which is bored for the purpose, is a rod 77, the front end of which abuts against the set screw 75 and the rear end of which is acted on by a cam roll 78 working in a cam groove 79 in the disc 80 to impart longitudinal movement to the rod 77, through a spring cushioning device 82, and thereby, at the appropriate times, cause the jaw 73 to rock on its pivot so as, in conjunction with the jaw 66, to grip and release the welt.

Instead of grinding the outer edge of the cutter as shown in Fig. 4 I may grind the inner edge in which event the axis of the cutter may be parallel or nearly so with respect to the line of work feed, and instead of the cutter being cylindrical it may be made conical or as a disc cutter, and as cutters of these various forms are known in inseam trimming machines it is not necessary to describe any particular means for supporting and driving them.

It will be understood that the knife blank may be deformed as described by being clamped in the clamps of the inseam trimming machine and the cutting edge ground thereon by the grinding disc on the machine, the said blank being thereafter hardened and tempered if this should be necessary, the cutter thereafter receiving a final trueing up. Or the blank may be corrugated and ground in a separate machine and after hardening and tempering (if necessary) trued up in the machine in which it is to be used, should trueing up be necessary.

What I claim is:

1. In an inseam trimming machine, the combination with a rotary inseam trimming member, of means to feed a shoe to the trimming member in a direction at an acute angle to the axis of rotation of said trimming member, said trimming member having a cutting edge constructed so that as said member is rotated said edge will alternately advance progressively and recede progressively in the line of the feed of the shoe which is at an angle to the axis of rotation.

2. In an inseam trimming machine, the combination with a rotary inseam trimming member having a continuous cutting edge, of means to feed a shoe to the trimming member in a direction at an acute angle to the axis of rotation, said cutting edge being constructed so that during the rotation of the trimming member the edge alternately advances progressively and recedes progressively in the line of feed of the shoe which is at an angle to the axis of rotation.

MARK THOMAS DENNE.

Witnesses:
CHAS. BAUER,
J. C. MATTHEWS.